US009749906B2

(12) United States Patent
Keller et al.

(10) Patent No.: US 9,749,906 B2
(45) Date of Patent: Aug. 29, 2017

(54) CONTROLLING A MOVEMENT OF A MOBILE TERMINAL BETWEEN RADIO ACCESS NETWORKS

(71) Applicant: TELEFONAKTIEBOLAGET L M ERICSSON (PUBL), Stockholm (SE)

(72) Inventors: Ralf Keller, Würselen (DE); Peter Hedman, Helsingborg (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 14 days.

(21) Appl. No.: 14/534,788

(22) Filed: Nov. 6, 2014

(65) Prior Publication Data
US 2015/0156699 A1 Jun. 4, 2015

(30) Foreign Application Priority Data

Nov. 6, 2013 (EP) .................................... 13191786

(51) Int. Cl.
*H04W 36/38* (2009.01)
*H04W 36/00* (2009.01)
(52) U.S. Cl.
CPC ...... *H04W 36/0022* (2013.01); *H04W 36/385* (2013.01)
(58) Field of Classification Search
CPC . H04W 36/0066; H04W 36/12; H04W 36/10; H04W 36/14; H04W 24/00
See application file for complete search history.

(56) References Cited

U.S. PATENT DOCUMENTS

| 8,620,323 | B1* | 12/2013 | Singh | ..................... H04W 8/26 455/436 |
| 9,055,497 | B2* | 6/2015 | Koo | ..................... H04W 36/20 |
| 2010/0135176 | A1* | 6/2010 | Kazmi | .................. H04W 24/08 370/252 |
| 2012/0008536 | A1* | 1/2012 | Tervahauta | ......... H04L 43/0811 370/311 |
| 2012/0172083 | A1* | 7/2012 | Logalbo | ................ H04W 8/186 455/525 |
| 2012/0214489 | A1* | 8/2012 | Koo | .................. H04W 36/0083 455/436 |
| 2012/0218889 | A1 | 8/2012 | Watfa et al. | |

FOREIGN PATENT DOCUMENTS

| WO | 9957933 A1 | 11/1999 |
| WO | 2011096870 A1 | 8/2011 |
| WO | 2012162190 A1 | 11/2012 |

OTHER PUBLICATIONS

Office Action in EP application No. 13191786.6 mailed Jan. 21, 2016.

* cited by examiner

*Primary Examiner* — Liton Miah
(74) *Attorney, Agent, or Firm* — Patent Portfolio Builders, PLLC

(57) ABSTRACT

Methods and apparatus for controlling a radio access handover with respect to a user equipment, UE, in a radio access domain from a first radio access network, RAN, to a second RAN are described. A radio access node of the first RAN receives a first message (M10) information to keep a radio connection to the UE. In reaction to the first message, a movement of the UE to the second RAN is inhibited, during a certain time period.

15 Claims, 4 Drawing Sheets

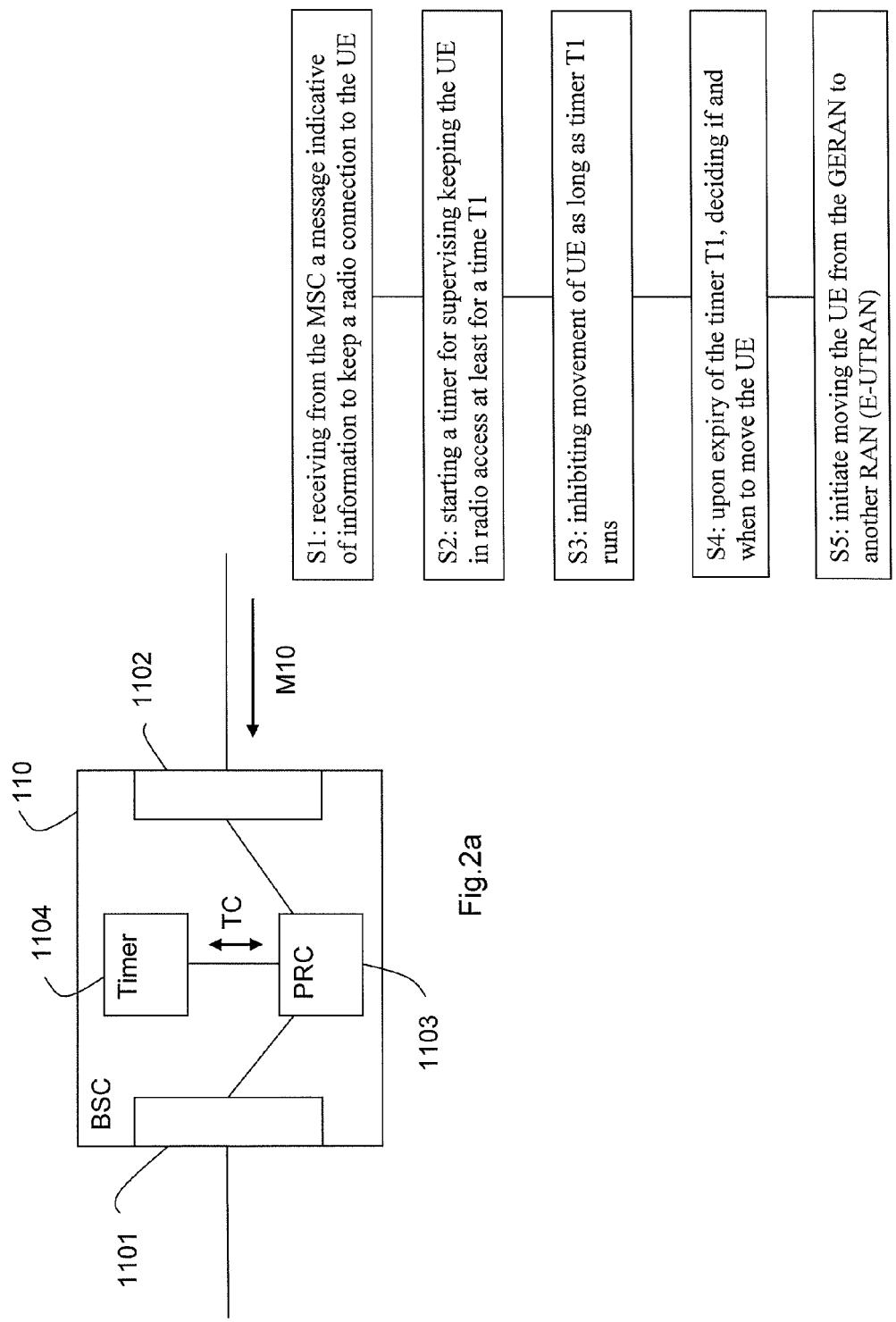

S21: detecting that there is lack of synchronization between the core network domain and the UE 10, S22: transmitting an information M10 to the first RAN 11 to keep a radio connection to the UE 10.

CONTROLLING A MOVEMENT OF A MOBILE TERMINAL BETWEEN RADIO ACCESS NETWORKS

CROSS REFERENCE TO RELATED APPLICATION(S)

The present application claims priority benefit of European Application No. 13191786.6, filed on Nov. 6, 2013, the contents of which are incorporated herein by reference in its entirety.

TECHNICAL FIELD

The present invention generally relates to a radio access network—RAN—selection, especially to moving a mobile terminal from a first RAN to a second RAN, and further especially to conditions for moving a mobile terminal from the first RAN to the second RAN.

BACKGROUND

Current 3GPP specifications provide various scenarios to moving a mobile terminal or user equipment, UE, from one radio access network, RAN, to another RAN. For example 3GPP TS 23.401, version 12.2.0, in the following being referred to as TS 23.401, discloses in section 5.5.2 different inter radio access technologies, RAT, handover scenarios RAT, e.g. from a circuit switched RAN (e.g. GERAN or UTRAN) to a packet switched RAN (e.g. a so-called evolved UMTS Terrestrial Radio Access Network, E-UTRAN). In case of multiple available RANs, such moving may be controlled e.g. by prioritizing one radio access type or technology over another one, e.g. prioritizing E-UTRAN over GERAN/UTRAN.

According to current 3GPP specifications, the UE is moved to E-UTRAN when receiving the Clear Command from the MSC, which will also release the RR connection. The MSC may send the Clear Command if all CS services are finished.

E.g. in order to allow a fast return to LTE after a so-called circuit switched fallback, CSFB, as being specified in 3GPP TS 23.272 version 12.0.0, e.g. the GERAN (i.e. the base station controller, BSC) notifies the UE about the LTE frequency at channel release, i.e. when BSC has received a so-called Clear Command from the MSC. Both the BSC and the UE will release its radio resource, RR, connection at reception of the channel release.

The RAN currently serving the UE may decide to move the UE to the other RAN based on rather static instructions, e.g. based on priority instructions provided by the core network (as currently specified for SGSN and MME). However, in some cases a prompt execution of such instructions may not be optimum. E.g. in a case wherein the core network and the UE status are not synchronized, and an immediate movement of the UE from the current RAN to the other RAN may prevent from completing useful or required signaling.

As an example, in a case wherein the UE has performed CSFB for an emergency call and is camping on a mobile switching center, MSC, which does not have subscriber data associated to the UE (to be provided by the corresponding visitor location register, VLR) the UE does not perform a location area update, LAU, prior to establishing the emergency call, but the MSC might have performed an "Update Location" procedure using IMSI. Hence a LAU would be required after the emergency call is completed, but if the UE is moved to E-UTRAN in the meantime, the LAU cannot be completed.

In another example, The MSC may have detected than the Temporary Mobile Subscriber Identity, TMSI, should be reallocated during a call, but the completing the TMSI reallocation procedure may not be possible as the UE is moved to E-UTRAN in the meantime.

SUMMARY

It is an object of the present invention to improve existing procedures.

This object is achieved by the independent claims. Advantageous embodiments are described in the dependent claims and by the following description.

In an embodiment the core network determines that a UE shall be kept connected to the current radio access network, RAN, although a movement to another RAN may be possible and/or generally recommended as expected according to current specifications. In order to inhibit a movement from the RAN currently serving the UE (current RAN) to any other RAN, it is proposed to provide a possibility that the core network informs or instructs the current RAN to keep the UE in current radio access.

In an embodiment, the informing or instructing may be performed by sending a message from a core network node to the current RAN comprising information to keep the UE in access.

In an embodiment, on reception of the information to keep the UE, the RAN may keep the UE e.g. at least for a configured time before moving the UE to another RAN. Keeping the UE at least for the configured time may comprise employing a timer in the RAN. The timer may be started upon the reception of the "keep"-information to expire after the configured time. Before the expiry of the timer, the RAN will not move or initiate a moving to any other RAN. After the expiry, the RAN may decide on its own if an when it will initiate the moving to the other RAN.

Alternatively, the RAN may keep the UE until receiving from the core network node a further indication that the UE may be moved now to another RAN.

In an embodiment, the signaling connection is kept open. Alternatively, the signaling connection is released by the UE, e.g. after an expiry of a timer controlling an abortion of the RR connection if not released by the network; such timer may be so-called timer T3240 as specified in 3GPP TS 24.008 version 12.3.0 to be realized within the UE to abort the RR connection and enter an idle state at expiry of this timer, if not released by the network.

In an embodiment, the information received by RAN comprises a command to temporarily change a priority of the currently used access e.g. to increase the priority such that it is equal or greater than a priority of an alternative RAN. Such priority change indication may be received e.g. from an appropriate core network node, e.g. from a MME/SGSN. In order to keep the core network nodes synchronized, the network node may initiate informing other core network nodes about the temporal priority change, so that the RAN might not get any different priority from another core network node.

In an embodiment, the core network node to inform the current RAN is a mobile switching center, MSC.

The present invention also concerns computer programs comprising portions of software codes in order to implement the method as described above when operated by a respective processing unit of appropriate nodes, e.g. a core network node or RAN node. The computer program can be stored on a computer readable medium. The computer-readable medium can be a permanent or rewritable memory within the user device or the recipient device or located externally. The respective computer program can be also transferred to the node for example via a cable or a wireless link as a sequence of signals.

In the following, detailed embodiments of the present invention shall be described in order to give the skilled person a full and complete understanding. However, these embodiments are illustrative and not intended to be limiting.

BRIEF DESCRIPTION OF THE FIGURES

FIG. 2a shows an exemplary block diagram of a node of the radio access domain according to a first embodiment, FIG. 2b shows a first exemplary sequence of steps to be performed in the node according to FIG. 2a, FIG. 3a shows an exemplary block diagram of a node of the radio access domain according to a second embodiment, and FIG. 3b shows a second exemplary sequence of steps to be performed in the node according to FIG. 3a, FIG. 4a shows an exemplary block diagram of a node of the core network domain co-operating with a node of the radio access domain according to FIG. 2a or FIG. 3a, and FIG. 4b shows a third exemplary sequence of steps to be performed in the node of the core network domain according to FIG. 4a.

DETAILED DESCRIPTION

Figure 1:
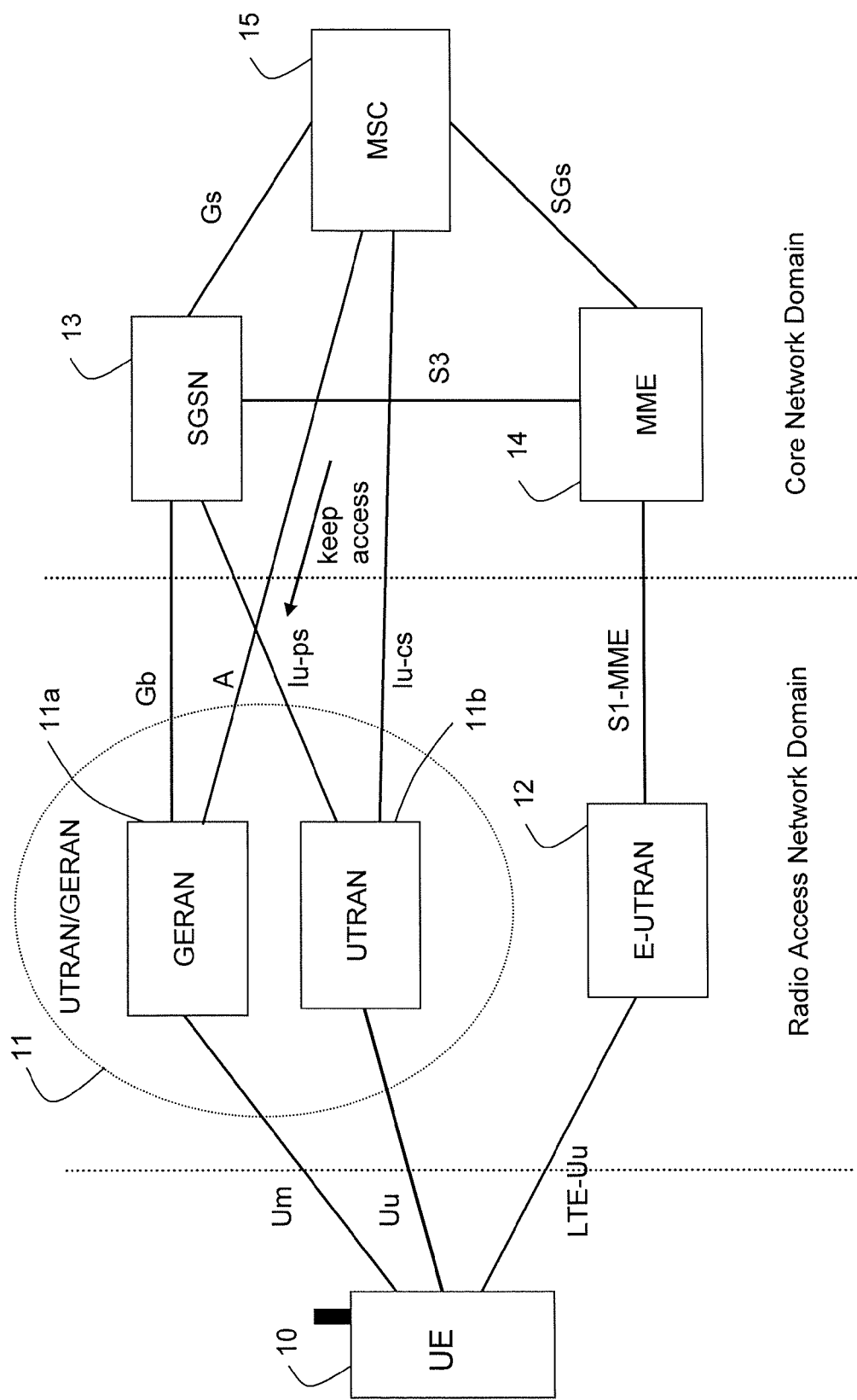
FIG. 1 shows an exemplary block diagram representing a radio access domain and a core network domain of a telecommunications network, wherein the core network indicates to the radio access domain to keep a UE in a current access.

FIG. 1 shows a block diagram of an exemplary telecommunications network connected to a mobile terminal or user equipment, UE, 10. The telecommunications network comprises a radio access network domain by way of example comprising a first radio access network, RAN, 11 and a second RAN 12, and a core network domain by way of example comprising a Serving GPRS Support Node, SGSN, 13 a Mobility Management Entity, MME 14 and a Mobile Switching Center (Server), MSC 15.

The first RAN 11 by way of example comprises a GSM EDGE Radio Access Network, GERAN, 11a and an UMTS Terrestrial Radio Access Network, UTRAN 11b. The second RAN 12 is by way of example an evolved UMTS Terrestrial Radio Access Network, E-UTRAN.

The MSC 15 by way of example comprises a visitor location register, VLR. The VLR is a database of the subscribers who have roamed into the coverage of the MSC 15 which it serves. One of its tasks is to temporarily copy certain subscriber data of said subscribers from a home location register, HLR. Another task is to track the location of said subscribers within the VLR area (location area).

Interfaces or reference points between the above-cited nodes are depicted in FIG. 1 according to 3GPP conventions:

Reference point Um refers to a radio protocol of GERAN between the UE 10 and the base station subsystem BSS of the GERAN 11a;

Reference point Uu refers to a radio protocol of URAN between the UE 10 and the base stations (Node B) of the UTRAN 11b;

Reference point LTE-Uu refers to a radio protocol of E-UTRAN between the UE 10 and E-UTRAN 12 base stations (eNodeB);

Reference point Gb refers to an interface between the GERAN 11a the SGSN 13. This interface may carry information concerning packet data transmission and mobility management;

Reference point A refers to an interface between the GERAN 11a and the Circuit Switched Core Network/MSC 15 that amongst others carries information concerning base station system, BSS, management, call handling and CS mobility management;

Reference point Iu-ps refers to an interface between the UTRAN 11b and the SGSN. This interface may carry information concerning RNS management, packet data transmission and mobility management;

Reference point Iu-cs refers to an interface between the UTRAN 11b and the Circuit Switched Core Network/MSC 15. This interface may carry user traffic and control information;

Reference point S1-MME refers to a control plane protocol between E-UTRAN 11b and MME 14;

Reference point S3 refers to an interface enabling user and bearer information exchange for inter 3GPP access network mobility in idle and/or active state;

Reference point Gs refers to an interface between the SGSN 13 and the MSC 15 that may be used by the SGSN to send location information to the MSC/VLR and to receive paging requests from the MSC/VLR. The Gs reference point may also be used by the MSC/VLR to indicate to the SGSN that an MS is engaged in a service handled by the MSC;

Reference point SGs refers to an interface between the MME and MSC/VLR which may be used for the mobility management and paging procedures between EPS and CS domain (based on Gs interface procedures).

Further, in FIG. 1 an exemplary arrow "keep access" is depicted being directed from the MSC 15 to the GERAN 11a. This arrow symbolizes an indication of the core network domain to keep the current access in the radio access domain. In the following embodiments thereto will be discussed.

A RAN currently serving the UE 10, e.g. RAN 11 of FIG. 1, may decide that the UE 10 should be handed over to another RAN e.g. RAN 12 of FIG. 1. A corresponding initialization and/or control of handing over may also be referred to as moving the UE 10 from the current RAN 11 to the other RAN 12. Details of moving a UE 10 may differ, e.g. depending on whether a handover from CS to PS or vice versa is involved or is not involved, and depending on which functionality is available in the involved RANs (especially in the current RAN). Details are described in aforementioned 3GPP TS 23.401 and 3GPP TS 23.060. One example of handling the moving is to prioritize E-UTRAN over GERAN/UTRAN so that a movement from GERAN/UTRAN RAN to E-UTRAN will be initiated as soon as E-UTRAN is available.

As discussed above, in certain situations it may be preferred not to move the UE 10 to the other RAN 12 (E-UTRAN) although the current RAN 11 would move or initiate the moving according to certain fulfilled conditions (e.g. E-UTRAN available and prioritized). Such certain situations may occur when the core network status and the UE status are not synchronized. Such lack of synchronization may require additional signaling in order to obtain a corresponding synchronization. If however the current RAN 11 is moving the UE 10 to a different RAN in such situation, it may not be possible to complete the signaling between the UE and core network to obtain the synchronization.

Thereto it is proposed to provide a possibility to indicate to the current RAN 11 not to move the UE 10 until the certain conditions are fulfilled, e.g. after the synchronization signaling is completed. The core network (e.g. the MSC 15 or any other core network node) may send a corresponding indication to the current RAN 11, e.g. during release of the RR connection, indicative of a command that the RAN should not move the UE.

In the absence of an indication to keep the UE 10, the RAN 11 may initiate a movement of the UE 10 to E-UTRAN 12 e.g. when receiving a Clear Command from the MSC 15, which will also release the RR connection (the MSC may send the Clear Command and release the RR connection if all CS services are finished). It may be noted that the UE may have a timer (T3240 as discussed above) to abort the RR connection if not released by the network (after the last CS service has finished). As soon the RAN 11 receives an indication to prevent the moving of the UE 10, the RAN 11 may delay or refrain from moving the UE 10 e.g. for a specified time or until a further indication is received.

According to the above-stated problem referring to a situation, wherein the UE 10 has performed CSFB for emergency call, but is camping on the MSC 15 which may not have VLR data, the MSC 15 (after detection of a missing LAU) sends an indication to the current RAN 11 to keep the UE 10 until the LAU has been completed (after completion of the emergency call).

According to the above-stated problem of TMSI reallocation, the MSC 15 (after detection that the TMSI should be reallocated during a call), sends an indication to the current RAN 11 to keep the RAN (i.e. not to move the UE 10 to E-UTRAN 12) until the TMSI reallocation procedure is completed.

FIG. 2a shows an exemplary block diagram of a GERAN node, e.g. a base station controller, BSC, 110 according to a first embodiment, in the following being referred to as first BSC 110. The (first) BSC 110 by way of example comprises a first interface 1101 adapted to connect to the UE 10, a second interface 1102 adapted to connect to the MSC 15, processor 1103 adapted to control said interfaces and a timer 1104 adapted to support the processor 113. A double arrow TC symbolizes a communication between the processor and the timer for controlling the timer 1104. This communication may comprise sending a command from the processor to the timer to start the timer and receiving at the processor timer state information (e.g. an information that the timer has expired). A first message M10 received at the second interface indicates to keep a radio connection with respect to the UE 10

In FIG. 2b, an exemplary sequence of steps is depicted:

In a first step S1 the BSC 110 receives from the MSC 15 the message M10 indicative of an information to keep a radio connection to the UE 10;

In a second step S2 the BSC 110 starts a timer for supervising keeping the UE in radio access at least for a time T1; this time T1 may be pre-defined and kept stored in the BSC; alternatively it may be additionally received from the MSC 15;

In a third step S3 the BSC 110 controls the UE 10 to be kept in access (at least) until the time T1 expires;

In a fourth step S4, upon expiry of the time T1, the BSC 110 decides if and when to move the UE 10;

In a fifth step S5, the BSC initiates moving the UE 10 to another RAN (E-UTRAN).

According to this embodiment, there is no need for any further signaling additionally to the first message M10 from the core network to the current RAN 11 (which may require a new RR connection). The RAN 11/BSC 110 may be adapted to decide on its own after the time T1 has elapsed, whether and when to move the UE 10, unless there is no further signaling by the core network (MSC 15).

In another embodiment, the RAN 11 does not keep stored or do not receive a time value of how long to keep the UE 10. In such embodiment, the RAN 11 may either wait for the core network (e.g. the MSC 15) to establish a RR connection (and being informed by the network e.g. the MSC), or it may inform the core network that the UE 10 can be moved.

Figure 3A:
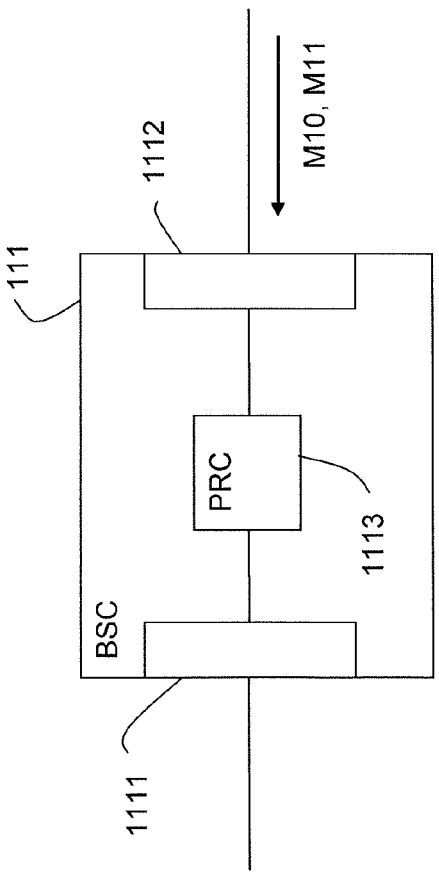

FIG. 3a thereto shows a second exemplary block diagram of a GERAN node, e.g. an alternative base station controller, BSC, 111, in the following being referred to as second BSC 111. Similarly to the first BSC 110, the (second) BSC 111 by way of example comprises a first interface 1111 adapted to connect to the UE 10, a second interface 1112 adapted to connect to the MSC 15 and processor 1113 adapted to control said interfaces in response to exemplary messages M10 and M11 received at the second interface. The first message M10 indicates to keep a radio connection with respect to the UE 10 is similar to the first message of the first sequence described in FIG. 2a. The second message M11 indicates that the UE 10 can be moved from now on. The second message M11 may be send as soon as any signaling for establishing synchronization between the core network domain and the radio access domain is completed.

Figure 3B:
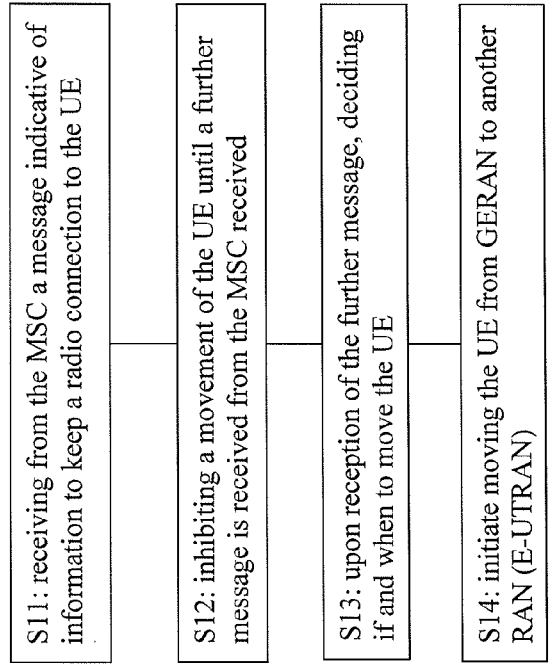

In FIG. 3b, an exemplary second sequence of steps is depicted:

In a first step (of this sequence) S11, similarly to the first sequence shown in FIG. 2b, the current RAN (BSC 111), receives the first message M10 from the core network (MSC 15).

In a second step (of this sequence) S12 the current RAN (BSC 111) inhibits a movement of the UE 10 until the second message M11 is received from the core network (MSC).

In a third step (of this sequence) S13, upon reception of the further message, the current RAN (BSC 111) decides if the UE shall be moved to another RAN and may further determine the time point when to move the UE 10.

In a fourth step (of this sequence) S14, the current RAN (BSC 111) initiates the moving of the UE 10 from the current RAN to the other RAN (E-UTRAN).

In an embodiment the current RAN 11 (e.g. the second BSC 111 according to FIG. 3a) may have a (second) timer to measure a second time T2 to wait for the RR connection; after an expiration of this time, the RAN 11 (BSC 111) may decide on its own whether and when to move the UE 10. An implementation of such time control may prevent the RAN 11 form waiting too long (endlessly) for a command from the core network before taking an action as described above.

Figures 4A, 4B:
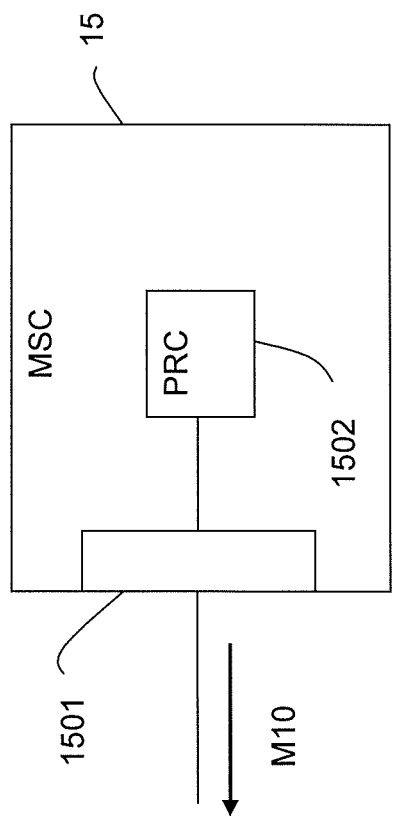

FIG. 4a shows an exemplary block diagram of a node of the core network domain co-operating with a node of the radio access domain according to above-described embodiments. Said node by way of example is an MSC 15 comprising an MSC interface 1501 to be connected to the access domain (e.g. to the BSC 110 or 111) and an MSC processor 1502 adapted to control said interface. The MSC processor is further adapted to detect a lack of synchronization to the UE 10 and to send the first message M10 to the access network domain FIG. 4b shows a third exemplary sequence of steps to be performed in the node of the core network domain according to FIG. 4a.

In a first step of S21 of this embodiment, the MSC 15 detects that there is lack of synchronization between the core network domain and the UE 10, in a second step of S22 of this embodiment the MSC 15 transmits an information M10 to the first RAN 11 to keep a radio connection to the UE 10.

In a further step, the core network node (e.g. the MSC 15) may initiate or ensure a completion of a signaling between the UE 10 and the core network domain (e.g. the MSC 15).

In a case according to above embodiments, i.e. in embodiment wherein the core network node is an MSC 15, the MSC 15 may ask the UE 10 for TMSI reallocation. This will ensure that the UE 10 will perform location update in order to reallocate the TMSI.

The invention claimed is:

1. A method of controlling a radio access handover with respect to a user equipment, UE, in a radio access domain from a first radio access network, RAN, to a second RAN, the method comprising:
receiving, by a radio access node of the first RAN, a first message from a node of a core network to keep a radio connection between the UE and the first RAN upon detection that the core network lacks synchronization to the UE; and
inhibiting, by the radio access node of the first RAN, the radio access handover of the UE to the second RAN during a certain time period indicated by the first message.

2. The method of claim 1, wherein upon receiving the first message, the radio access node starts a supervision for supervising that the radio connection between the UE and the first RAN is kept for the certain time period.

3. The method of claim 2, wherein the supervision is carried out by a timer in the radio access node, wherein the timer is started upon receiving the first message and the timer provides an indication of expiry after the certain time period has elapsed.

4. The method of claim 3, wherein the timer is provided with a timer value according to the certain time period, and wherein the timer value is one of: kept stored in the radio access node and received from the core network.

5. The method of claim 4, wherein the radio access node initiates handing over the UE to the second RAN after an expiry of the certain time period.

6. The method of claim 1, wherein upon receiving the first message, the radio access node starts a supervision for supervising that the radio connection between the UE and the first RAN is kept until a second message indicative of an allowance of the radio access handover of the UE to the second RAN is received from the node of the core network.

7. The method of claim 1, wherein the node of the core network is a mobile switching center, MSC, and wherein the radio access node is one of a base station controller, BSC, and a radio network controller, RNC, of the first RAN.

8. The method of claim 7, wherein the MSC transmits the first message to the radio access node in order to complete a location area update procedure, LAU, preferably after a circuit switched, CS, fallback emergency call.

9. The method of claim 8, wherein the MSC transmits the first message to the radio access node after a detection that a temporary mobile subscriber identity, TMSI, should be reallocated before the UE is handed over to the second RAN.

10. The method of claim 1, wherein upon receiving the first message, the radio access node starts a supervision for supervising that the radio connection between the UE and the first RAN is kept until the synchronization between the core network and the UE is completed.

11. A radio access node of a first radio access network, RAN, adapted to control a radio connection of a user equipment, UE, to the first RAN and to initiate a radio access handover to a second RAN, the radio access node of the first RAN comprising a processor adapted to:
receive, by the radio access node of the first RAN, a first message from a node of a core network to keep the radio connection between the UE and the first RAN upon detection that the core network lacks synchronization to the UE; and
inhibit, by the radio access node of the first RAN, the radio access handover of the UE to the second RAN during a certain time period indicated by the first message.

12. A computer programmable product comprising a non-transitory computer-readable medium, the non-transitory computer-readable medium storing program code instructions which when executed by a processor performs the method of claim 1.

13. A method of controlling a radio access handover with respect to a user equipment, UE, in a radio access domain from a first radio access network, RAN, to a second RAN, the method comprising:
detecting, by a core network node of a core network domain connected to the radio access domain, lack of synchronization between the core network domain and the UE; and
transmitting, by the core network node, upon detecting the lack of synchronization between the core network domain and the UE, an information to a radio access node of the first RAN to keep a radio connection between the UE and the first RAN and to inhibit the radio access handover of the UE to the second RAN during a certain time period indicated by the information.

14. A core network node of a core network domain connecting to a first radio access network, RAN, of a radio access network domain, the core network node comprising:
a detector adapted for detecting lack of synchronization between the core network domain and a user equipment, UE; and
an interface adapted for transmitting, upon detecting the lack of synchronization between the core network domain and the UE, an information to a radio access node of the first RAN to keep a radio connection to the UE and to inhibit a radio access handover of the UE to a second RAN during a certain time period indicated by the information.

15. A computer programmable product comprising a non-transitory computer-readable medium, the non-transitory computer-readable medium storing program code instructions which when executed by a processor performs the method of claim 13.

* * * * *